Dec. 25, 1956  G. WÖHLBIER  2,775,332
LINE SPACE DEVICE FOR OFFICE TYPING MACHINE
Filed Nov. 18, 1955  2 Sheets-Sheet 1

Inventor
Günther Wöhlbier

By Pierce, Scheffler & Parker
Attorneys

Dec. 25, 1956  G. WÖHLBIER  2,775,332
LINE SPACE DEVICE FOR OFFICE TYPING MACHINE
Filed Nov. 18, 1955  2 Sheets-Sheet 2

Inventor
Günther Wöhlbier
By Pierce, Scheffler & Parker
Attorneys

United States Patent Office 2,775,332
Patented Dec. 25, 1956

2,775,332

LINE SPACE DEVICE FOR OFFICE TYPING MACHINE

Günther Wöhlbier, Wilhelmshaven, Germany, assignor to Olympia Werke A. G., Wilhelmshaven, Germany Application November 18, 1955, Serial No. 547,694

Claims priority, application Germany April 21, 1955

3 Claims. (Cl. 197—114)

This invention relates to a line space device for office typing machines in which, for the displacement of the line space wheel, the shift pawl carrier mounted for oscillation co-axially with the platen can be actuated selectively by hand by the line space lever through a two-arm transmission lever articulated by means of coupling rods or by a power drive through a slide arrangement coupled to the hand lever drive, the shift pawl carrier being, in the case of power drive, lockable in its end position by means of a locking device and automatically releasable upon completed line shifting.

This locking device serves, as is known, to lock the shift pawl carrier during the carriage movement following the line spacing until the end thereof, in order that the vibrations of the slide or its connecting members to the power drive, caused by alternating mechanical resistances, will not produce any additional forward movement of the line space wheel.

In a known line space device of the kind referred to, the arrangement is such that the power drive acts by way of a guide on a shaft which is horizontally disposed on the back of the paper carriage at right angles to the platen axis and is mounted in the rear wall of the carriage, the straight slide being articulated for oscillation at the end of said shaft provided with a second guide. In said slide there is guided a bolt serving as a sliding block which is fastened to an arm of the transmission lever for the hand lever drive which is mounted for oscillation on a hub disposed parallel to the typewriter axis and which is in operative connection with the shift pawl carrier.

This arrangement is found to be unfavorable inasmuch as the transmission lever and the slide are mounted at separate points of support with crossing axial directions, owing to which the bolt of the transmission lever guided in the slide and the articulation bolt of the slide at the second guide of said shaft are guided on arcs in planes of movement at right angles to each other. Since the deflection of movement occurs precisely over the slide, which is, moreover, of rectilinear design, the latter including its associated bearing organs is exposed to extremely high distortion and bending stresses, owing to which there is danger of seizing of the entire lever mechanism, and to heavy wear at the slide and the respective bearing organs. The large number of additional gear members required for this arrangement, resulting in a larger number of points of support, leads to an increased frictional resistance of the entire device, which is further increased due to the fact that the locking device is designated as a lever provided with a ratchet and pivotably arranged at the frame, the lever being continuously pressed against the transmission lever of the hand lever drive by spring traction.

The invention has for a principal object to provide a line space device of the kind referred to, in which only a few, essentially only three, additional structural elements are required for the gear parts required for the manual drive, and in which the association of the various gear parts is such that all shift movements extend in parallel planes, owing to which a reliable functioning of the device is insured at all times without high bending and frictional forces. The invention is characterized in that a cam provided with the slide and becoming operative for power drive as well as the two-arm transmission lever for manual drive are pivotably disposed on a common hub arranged parallel to the platen axis and are in kinetic connection with the shift pawl carrier through a pin disposed on a coupling rod, in such manner that the pin protrudes through the slide and is embraced over a portion of its periphery by the associated hook-shaped end of the two-arm transmission lever, so that the cam as well as the transmission lever, without mutual interaction and independently of each other, can have a driving action on the pin provided at the coupling rod of the shift pawl carrier.

In the more specific embodiment it is further provided that the slide of the cam is designated as an arc around the hub as center and is angularly offset at one end, there being pivotably arranged, at the coupling rod associated with the shift pawl carrier and with the cam provided with the slide, a spring loaded locking pawl which, for power drive, cooperates with a stop provided adjustably at the frame in such manner that at the end of the forward movement of the cam there is produced first an engagement and hence a locking of the shift pawl carrier in the end position, and at the end of the return movement of the cam, due to the entering of the pin of the coupling rod sliding in the slide into the angular bend, a disengagement of the locking pawl and hence a snapping back of the shift pawl carrier into the inoperative position caused by a return spring.

In this design of the locking device, the occurring frictional forces and additional machine noises are advantageously reduced to a minimum in that the locking pawl comes into contact with the stop only during the engaging, while in all other cases, it swings freely over the stop without contact.

With the co-axial arrangement of the transmission lever and of the cam according to the invention, it has become possible to assemble the entire line space device compactly, without having any gear parts, e. g. shafts or levers, protruding from the device and thus possibly interfering with the other functions and with the appearance of the paper carriage.

Further details will be seen from the attached drawing, which illustrates the subject matter of the invention with reference to one practical embodiment. In these drawings.

Figure 5:
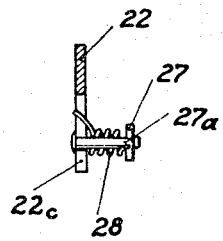
Figure 6:
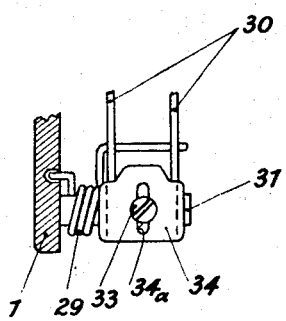

Figs. 5 and 6 likewise show details in side view.

With reference now to the drawings wherein corresponding elements in the several views bear the same reference numerals, the most important gear parts of the line space device are assembled together compactly in known manner at one lateral wall 1 of the paper carriage and can be covered by a hood not shown in detail.

In this lateral wall 1, the platen axis 2 with the line space wheel 3 indicated in chain-dotted lines is rotatably mounted in a sleeve 4.

An arm 1a offset at right angles above the lateral wall 1 has pivotably disposed on it the line space lever 5 for manual drive by means of a screw 6, a sleeve 7, and a disk 8. To the outer end of an arm 5a of the line space lever 5 standing out at an obtuse angle there is articulated a coupling rod 9 which is provided with a lug 9a which in the inoperative position abuts against the line space lever 5 and thereby fixes the position thereof. The angle of deflection of the line space lever 5 is limited by a stop bolt 10 depending from the arm 1a of the lateral wall 1.

The coupling rod 9 is articulated to a two-arm transmission lever 11 which is mounted pivotably on a hub 12 fastened parallel to the platen axis in the lateral wall 1. The lower end 11a of the lever 11 is hook-shaped and provided with a lug 11b in which a return spring 13, fastened to the lateral wall 1, is hooked.

On the same hub 12, between the lateral wall 1 and the transmission lever 11, there is pivotably arranged a cam 14 of more or less semicircular design, which is under the action of a rotary spring 15, also disposed on the hub 12. At the lower portion of cam 14 there is provided a slide 16, designed as a slot, and which extends around the hub 12 over the portion of an arc, and whose end 16a facing the axis 2 is bent upward at an obtuse angle. The upper part of the cam 14 is provided with a lug 17 and a bolt 18 to receive and fasten a traction belt 19, which is in operative connection with the power drive in known manner not shown in detail. Also, a bolt 20, which serves at the same time as a stop for the cam 14 in its inoperative position and as a counterbearing for the spring 15, is fastened in the lateral wall 1.

A pin 21 fastened at one end of another coupling rod 22 is guided slidingly in the slot 16, this coupling rod 22 being articulated with the known shift pawl carrier 24, which is mounted pivotably on the sleeve 4 co-axially with the platen axis and is provided with the shift pawl 23. A downwardly extending lug 22a of the coupling rod 22 has inserted in it a return spring 25 which is fastened at its opposite end to the lateral wall 1. By the action of this spring 25, the coupling rod 22 is acted upon in such manner that the pin 21 bears against the rear end of the slot 16, the hook-shaped end 11a of the transmission lever 11 embracing the part of the pin 21 protruding through the slot 16 over a portion of its periphery. Further, the coupling rod 22 is provided with a lug 22b, offset downwardly, which in the inoperative position strikes against a stop 26 fastened on the lateral wall 1, and provided with a covering of rubber or the like. Another downwardly extending arm 22c of the coupling rod 22 has pivotably arranged on it a locking pawl 27 which is under the action of a spring 28 (see Fig. 5) and is held in the inoperative position by a lug 27a, offset at right angles, and resting on the upper edge of the arm 22c. Below the line space wheel 3, a U-shaped ratchet lever 30 of conventional construction under the action of spring 29 (see Fig. 6) is pivotably arranged about a hub 31 fastened to the lateral wall 1, it being provided at the upper open end with a pin 32 which engages in the toothing of the line space wheel 3 and elastically retains it in its particular angle position. At the other closed end of the ratchet lever 30, a stop 34 designed as a slider and adjustable in vertical direction by means of a screw 33 and slotted hole 34a also shown in Fig. 6, is arranged in such manner that its upper edge projects by a small amount over the upper edge of the ratchet lever 30.

Between the transmission lever 11 and the line space wheel 3 there is arranged at the lateral wall 1 a stop 35 against which the shift pawl 23 strikes at the end of its shift movement, owing to which the angle of deflection of the shift pawl carrier 24 is limited.

Figure 4:
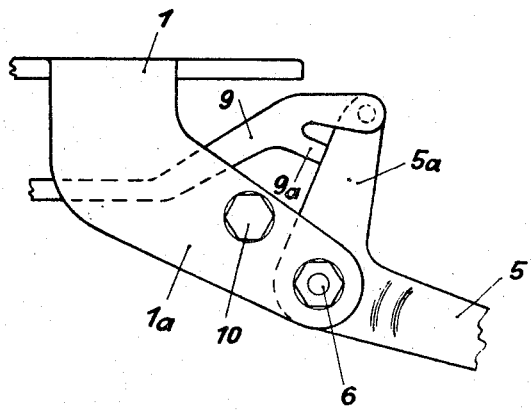
Fig. 4 is a detail showing the support of the line space lever in top view.

The line space device operates as follows:

For manual operation, the line space lever 5 is turned counterclockwise (Fig. 4) until the arm 5a strikes against the stop bolt 10. The coupling rod 9 articulated on this arm 5a then turns in the same direction the transmission lever 11 against the restoring action of the spring 13, which in turn displaces with its hook-shaped lever end 11a the pin 21 of the coupling rod 22 inside the slot 16 of the cam 14, which remains in its inoperative position, into the upwardly bent end 16a of the slide slot 16.

This movement of the pin 21 and hence of the coupling rod 22, which occurs against the restoring action of spring 25, is transmitted to the articulated shift pawl carrier 24, which in turn acts through the shift pawl 23 in known manner on the line space wheel 3 for the purpose of advancing the platen. The angular movement of the shift pawl carrier is limited by the abutment of the shift pawl 23 against the stop 35.

Figure 1:
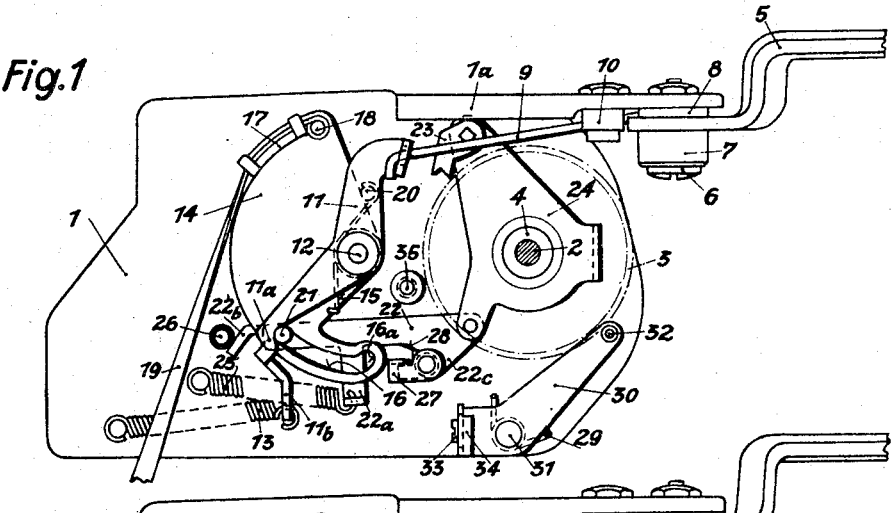
Fig. 1 is a transverse view of the line space device with all gear parts in non-operative position.
Figure 2:
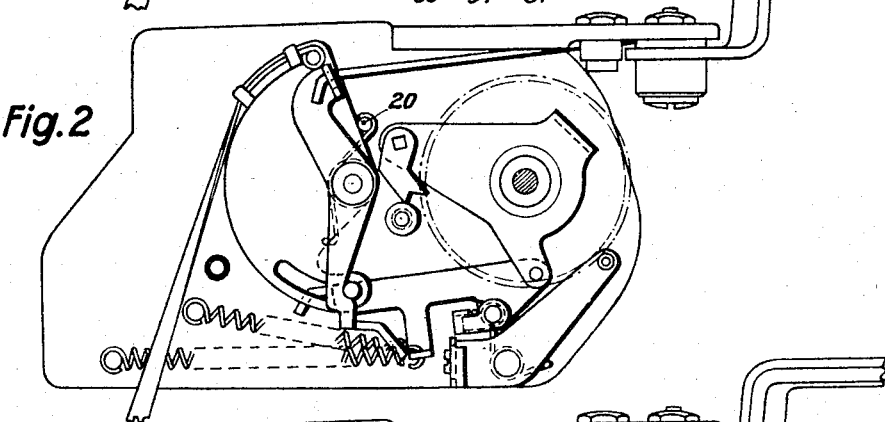
Fig. 2 is a view similar to Fig. 1, showing the end position of the gear for manual drive.

By the entering of the pin 21 into the upward bend 16a of slot 16, the coupling rod 22 is guided and lifted in such manner that during the forward movement, as well as during the return of the coupling rod 22 the locking pawl 27 swings freely over the stop 34 without touching it. After release of the line space lever 5, the coupling rod 22 with the shift pawl carrier 24 is returned by spring 25, and the transmission lever 11 with the coupling rod 9 and the line space lever 5 by spring 13, into the inoperative position shown in Figs. 1 and 4. To avoid a hard impact of the pin 21 on the end of the slot 16, the coupling rod 22 runs with its lug 22b against the stop 26, which is provided with a covering of rubber or the like to damp the noise.

Figure 3:
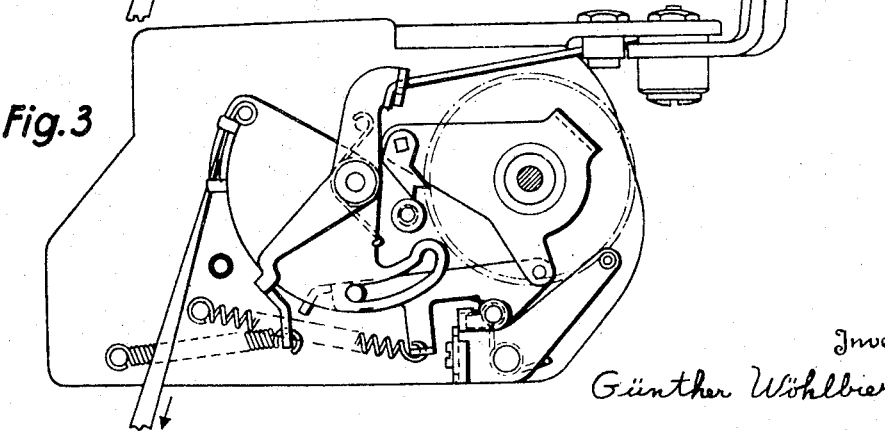
Fig. 3 is a view similar to Fig. 1, showing the end position of the gear for power drive.

For power drive, for example by an electric motor, the drive of the shift pawl carrier 24 occurs through the traction belt 19 which is wound in known manner on a drum, not shown in detail, connected with the motor shaft. The tractional force exerted thereby through the belt 19, which is symbolized in Fig. 3 by an arrow, causes a turning movement of the cam 14 counterclockwise against the action of spring 15. The pin 21 of the coupling rod 22 bearing against the end of the slide slot 16 is then entrained, which thereby causes the forward shifting of the line space wheel 3 and hence of the platen in the previously described manner through the shift pawl carrier 24 and shift pawl 23. The transmission lever 11, remains with the coupling rod 9 and the line space lever 5 in its inoperative position.

As distinguished from the previously described course of movement, the pin 21 is guided in this case exclusively on an arc around the hub 12, owing to which the coupling rod 22 comes into a lower position at the end of its swinging movement, and thus the locking pawl 27 can engage behind the stop 34. Owing to the turnable attachment of the locking pawl 27, the latter slides over the stop 34 with a slight by-passing movement before engagement. After engagement, the shift pawl carrier 24 remains locked in its outward position, as is visible from Fig. 3.

Upon termination of the carriage movement following the line space movement, the tractional force occurring in belt 19 diminishes, owing to which the spring 15 can turn the cam 14 back into its inoperative position determined by the stop 20. The sides of the slide slot 16 then glide past the pin 21 until the bend 16a of the slot reaches the pin 21, owing to which the pin 21 and hence the coupling rod 22 will now be raised by a small amount and thus the locking pawl 27 can disengage from its locked position behind the stop 34. Thereupon the coupling rod 22 together with the shift pawl carrier 24 is moved back in the previously described manner into the inoperative position shown in Fig. 1.

In conclusion, while a preferred embodiment of the invention has been herein described and illustrated, it will be evident that minor changes in the construction and arrangement of component parts may be made without, however, departing from the spirit and scope of the invention as defined in the appended claims.

I claim:

1. A line space device for advancing the platen of office typing machines selectively by hand and also automatically as the platen carriage reaches the end of its travel comprising a line space wheel secured to the platen shaft for advancing the platen, a shift pawl carrier rotatably mounted coaxially with the common axis of the line space wheel and platen, a shift pawl secured to said carrier for engaging said line space wheel to advance the same and hence also said platen as said shift pawl carrier is rotated, a hand operated line space lever, a dual arm transmission lever mounted for rotation on a hub whose axis is parallel to the platen axis, means connecting one arm of said transmission lever to said line space lever, a cam plate mounted for rotation on said hub, said cam plate having a slot therein, a coupling rod pivotally connected at one end to said shift pawl carrier, said coupling rod including a pin engaged in the slot of said cam plate, said pin also being engaged by the other arm of said transmission lever, spring means loading said coupling rod and shift pawl carrier to their starting positions, and a power drive connected to said cam plate for rotating said plate when said platen carriage reaches the end of its travel, said pin and hence also said coupling rod and shift pawl carrier being actuatable by said cam plate and also by said transmission lever acting independently of one another.

2. A line space device as defined in claim 1 wherein said slot in said cam plate is for the most part in the form of an arc having its center of curvature located on the axis of said hub, said slot being offset at an angle at the outer end thereof.

3. A line space device as defined in claim 1 and which further includes a spring loaded pivotally mounting locking pawl on said coupling rod and cooperative with an adjustable stop such that at the end of the rotative movement of said cam plate in the direction actuating said pin, said locking pawl engages said stop thereby to hold said coupling rod and hence also said shift pawl carrier in the actuated position during return movement of said cam plate to nearly its starting position, the outer end of said slot in said cam plate including an offset portion engaging said pin for lifting the same and hence also said coupling rod and said locking pawl thereby to release the latter from said stop thereby enabling said spring loading means to quickly move said coupling rod and said shift pawl carrier back to their respective starting positions.

No references cited.